(12) United States Patent
Homma et al.

(10) Patent No.: US 10,339,955 B2
(45) Date of Patent: Jul. 2, 2019

(54) INFORMATION PROCESSING DEVICE AND METHOD FOR DISPLAYING SUBTITLE INFORMATION

(71) Applicant: SONY CORPORATION, Minato-ku (JP)

(72) Inventors: Fuminori Homma, Tokyo (JP); Yasushi Okumura, Tokyo (JP); Ken Miyashita, Tokyo (JP); Tatsushi Nashida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 536 days.

(21) Appl. No.: 14/365,682

(22) PCT Filed: Jan. 25, 2013

(86) PCT No.: PCT/JP2013/000379
§ 371 (c)(1),
(2) Date: Jun. 16, 2014

(87) PCT Pub. No.: WO2013/114837
PCT Pub. Date: Aug. 8, 2013

(65) Prior Publication Data
US 2015/0006174 A1    Jan. 1, 2015

(30) Foreign Application Priority Data
Feb. 3, 2012  (JP) .................. 2012-021840

(51) Int. Cl.
*G10L 21/10* (2013.01)
*G09B 5/06* (2006.01)
(Continued)

(52) U.S. Cl.
CPC ............. *G10L 21/10* (2013.01); *G09B 5/06* (2013.01); *G09B 5/065* (2013.01); *G09B 19/04* (2013.01);
(Continued)

(58) Field of Classification Search
CPC .................................... H04N 5/92; H04B 1/20
(Continued)

(56) References Cited

U.S. PATENT DOCUMENTS 5,465,240 A * 11/1995 Mankovitz ............. G09B 5/065
                                                       360/48
5,809,467 A *  9/1998 Otsuka .................... G10L 13/08
                                                       704/201
(Continued)

FOREIGN PATENT DOCUMENTS

EP        1 536 426 A1    6/2005
EP        2 270 642 A2    1/2011
(Continued)

OTHER PUBLICATIONS

V. Zue, "The Use of Speech Knowledge in Automatic Speech Recognition," Proceedings of the IEEE, Nov. 1985.*
(Continued)

*Primary Examiner* — Feng-Tzer Tzeng
(74) *Attorney, Agent, or Firm* — Chip Law Group

(57) ABSTRACT

An information processing system that reads a current playback time of content reproduced by an output device; controls a display to display subtitle information corresponding to the content reproduced by the output device; acquires feature information corresponding to an attribute of the content based on the read current playback time of the content; and controls the display to apply a predetermined effect corresponding to the displayed subtitle information based on the acquired feature information.

20 Claims, 16 Drawing Sheets

(51) Int. Cl.
  *G09B 19/04* (2006.01)
  *G09B 19/06* (2006.01)
  *G10L 15/02* (2006.01)
  *G10L 15/26* (2006.01)
  *H04N 5/92* (2006.01)
  *H04B 1/20* (2006.01)

(52) U.S. Cl.
  CPC .............. *G09B 19/06* (2013.01); *G10L 15/02* (2013.01); *G10L 15/26* (2013.01); *H04B 1/20* (2013.01); *H04N 5/92* (2013.01)

(58) Field of Classification Search
  USPC ............................................................ 369/1
  See application file for complete search history.

(56) References Cited

U.S. PATENT DOCUMENTS

| | | | | |
|---|---|---|---|---|
| 8,248,528 | B2* | 8/2012 | Hosking | H04N 7/165 348/461 |
| 8,281,231 | B2* | 10/2012 | Berry | G11B 27/10 715/201 |
| 9,141,938 | B2* | 9/2015 | Goldberg | G06Q 10/10 |
| 2004/0006481 | A1* | 1/2004 | Kiecza | G10L 25/78 704/276 |
| 2004/0138894 | A1* | 7/2004 | Kiecza | G10L 15/28 704/277 |
| 2004/0152054 | A1 | 8/2004 | Gleissner et al. | |
| 2006/0183088 | A1* | 8/2006 | Masuko | G09B 5/06 434/157 |
| 2008/0099161 | A1* | 5/2008 | Liu | E06B 9/307 160/177 R |
| 2009/0006087 | A1* | 1/2009 | Imoto | G10L 15/26 704/231 |
| 2011/0096135 | A1* | 4/2011 | Hegde | H04N 5/23219 348/14.07 |
| 2012/0275761 | A1* | 11/2012 | Li | H04N 9/8233 386/239 |

FOREIGN PATENT DOCUMENTS

| | | |
|---|---|---|
| JP | 05-289607 A | 11/1993 |
| JP | 07-261652 A | 10/1995 |
| JP | 08-179789 A | 7/1996 |
| JP | 9-115224 A | 5/1997 |
| JP | 2004-302285 A | 10/2004 |
| JP | 2006-106334 A | 4/2006 |
| JP | 2006-518872 A | 8/2006 |
| JP | 2009-036885 A | 2/2009 |

OTHER PUBLICATIONS

Zue, "The Use of Speech Knowledge in Automatic Speech Recognition," Proceedings of the IEEE, Nov. 1985.*
Office Action received for Japanese Patent Application No. 2012-021840 dated Dec. 1, 2015.
Office Action received for Japanese Patent Application No. 2012-021840, dated Apr. 5, 2016, 2 pages of office action.

* cited by examiner

[Fig. 1]

『Then he'll ask, "Can you make more?"』

Then he'll ask, "Can you make more?"

⇩

Then he'll ask, "Can you make more?"

⇩

Then he'll ask, "Can you make more?"

SYNCHRONIZE AUDIO OUTPUT POSITION AND CURSOR POSITION

[Fig. 2]

(PATTERN 1)

『Then he'll ask, "Can you make more?"』

Then he'll ask, "Can you make more?"

⬇

Then he'll ask, "Can you make more?"

(PATTERN 2)

『Then he'll ask, "Can you make more?"』

Then he'll ask, "Can you make more?"

⬇

Then he'll ask, "Can you make more?"

(PATTERN 3)

『Then he'll ask, "Can you make more?"』

Then he'll ask, "Can you make more?"

⬇

Then he'll ask, "Can you make more?"

[Fig. 3]
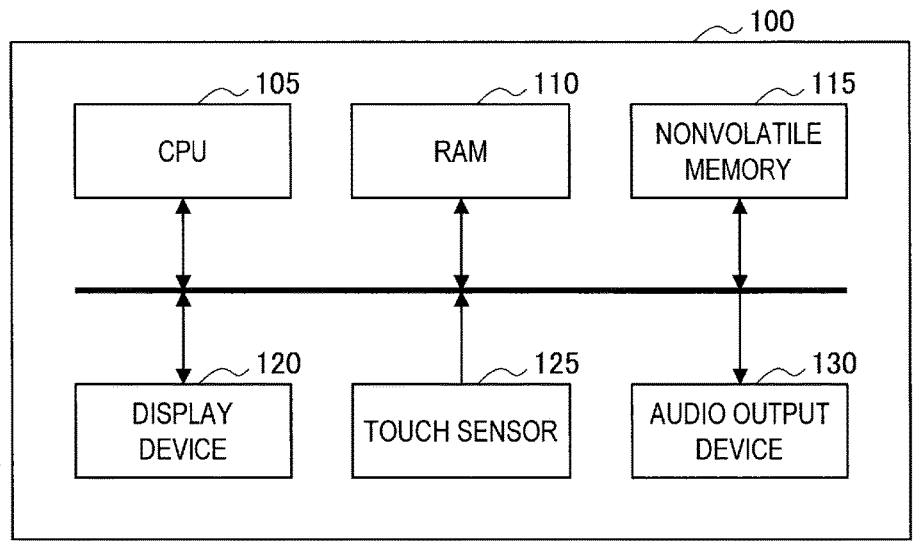
[Fig. 4]
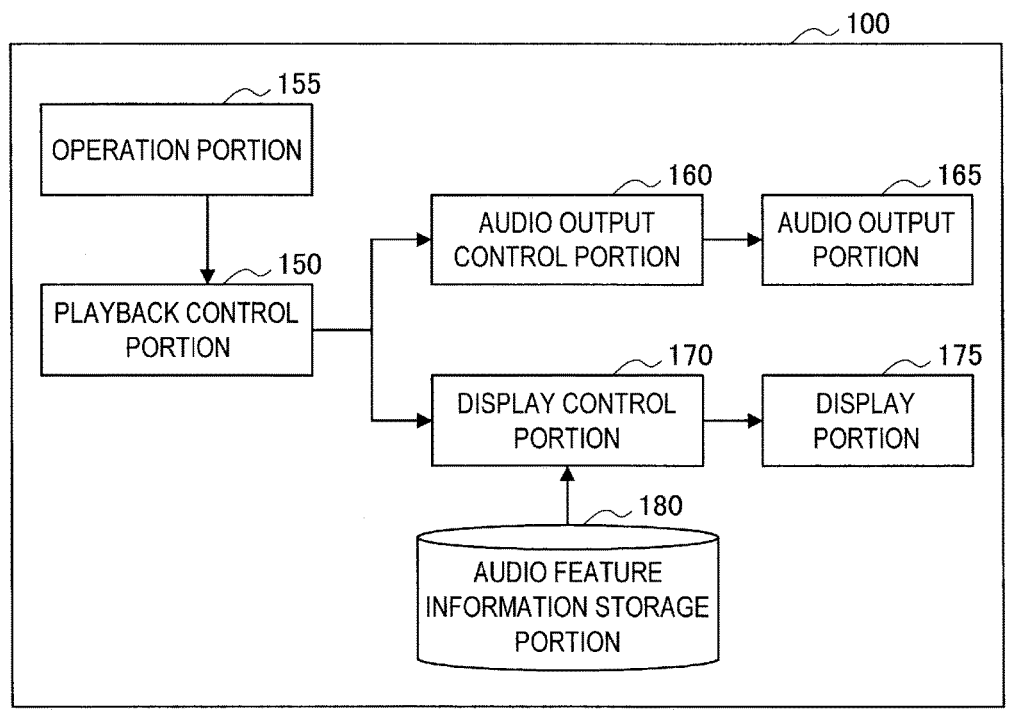

[Fig. 5]
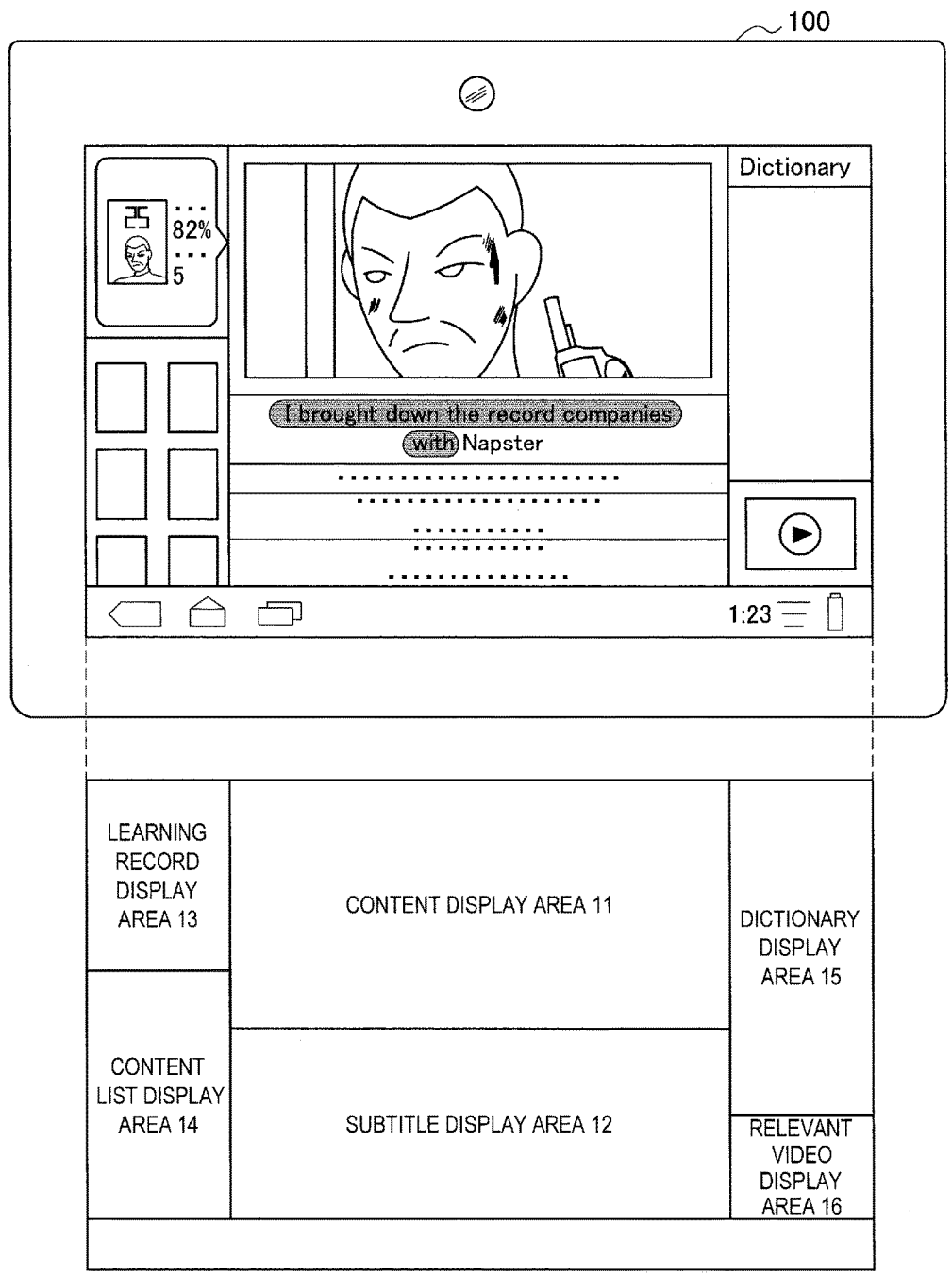

[Fig. 6]
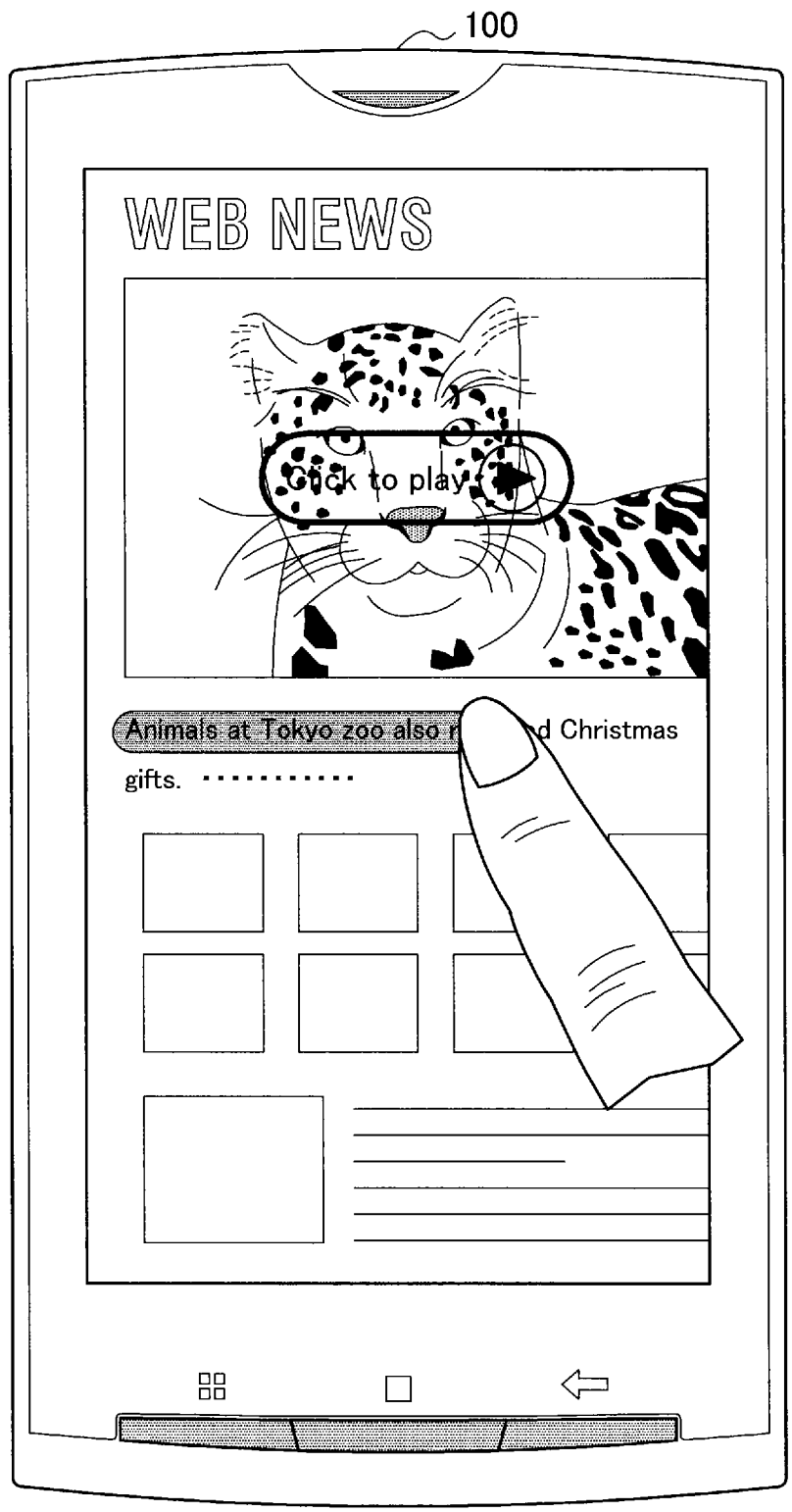

[Fig. 7]

FORMAT EXAMPLE OF AUDIO FEATURE INFORMATION
CommandID + TIME (MILLISECONDS) + SEPARATOR CommandID (EXAMPLES)
PU: PITCH INCREASES (PITCH UP)
PD: PITCH DECREASES (PITCH DOWN)
SP: TEMPO CHANGES (CURSOR SPEED CHANGE POINT)

DESCRIPTION EXAMPLES
PU24868; PITCH RISES AT 24868 msec
SP25058; TEMPO CHANGES AT 25058 msec

[Fig. 8]

SUBTITLE EXAMPLES 1
00:00:17,798 _ _> 00:00:20,130 ⇒SUBTITLE ID
[SALA]PU17858;PD20138; ⇒SUBTITLE DISPLAY TIME
Did you know there are more people ⇒AUDIO FEATURE INFORMATION
with genius IQa living China ⇒SUBTITLE TEXT 2
00:00:20,233 _ _> 00:00:22,258
[SALA]SP20178;PU22178
than there are people of any kind
living in the United States?

3
00:00:22,336 _ _> 00:00:24,133
[SALA]PU22228;PD23348;SP23358;SP23648
-That can't possibly be true.
-It is.

4
00:00:24,237 _ _> 00:00:25,261
[SALA]PU23728;PU24818;
What would account for that?

5
00:00:25,339 _ _> 00:00:28,331
[SALA]PU24868;PU25058;SP25068;SP25258;SP25268;PU26448;PD26458;SP27938;
Well, first, an awful lot of people
live in China, but here's my question.

6
00:00:28,442 _ _> 00:00:30,569
[SALA]PU28388;SP30478;
How do you distinguish yourself
in a population of people 7
00:00:30,644 _ _> 00:00:32,475
[SALA]PU30538;SP31948;
who all got 1600 on their SATs?

8
00:00:32,579 _ _> 00:00:34,342
[SALA]PU32068;SP33848;SP33868;PD34278;
-I didn't know they take SATs in China.
-They don't.

[Fig. 9]
```
9
00:00:34,448 _ _>00:00:36,575
[SALA]SP34348;SP35568;SP35578;SP36188;
I wasn't talking about China anymore,
I was talking about me.
```
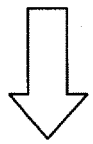
CURSOR SPEED ALLOCATION
| CURSOR DISPLAY START TIME (msec) | | CURSOR DISPLAY END TIME (msec) |
|---|---|---|
| 34348 | "I wasn't talking about China anymore," | 35568 |
| 35578 | "I was talking about me." | 36188 |

[Fig. 10]
ENLARGEMENT AND REDUCTION  ROTATION  VERTEX DEFORMATION
case In Expo
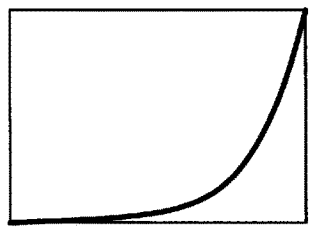
case Out Expo
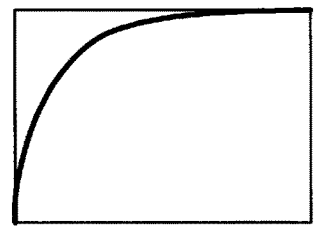
case In Out Expo
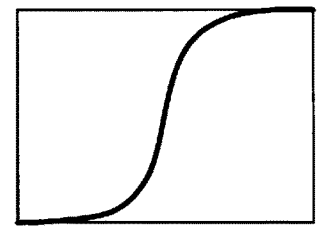
case In Elastic
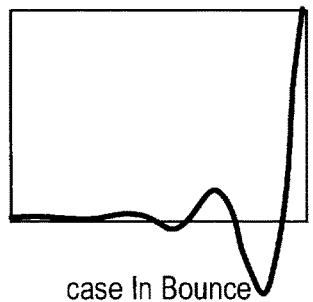
case Out Elastic
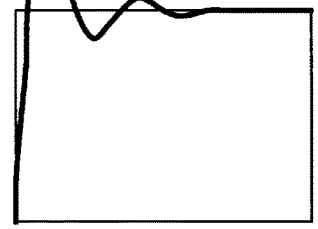
case In Out Elastic
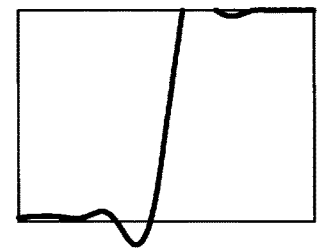
case In Bounce
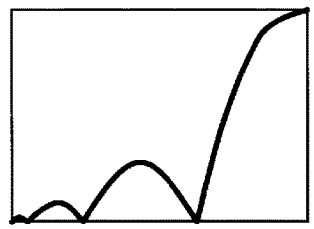
case Out Bounce
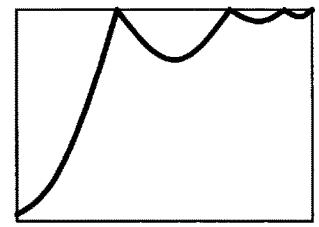
case In Out Bounce
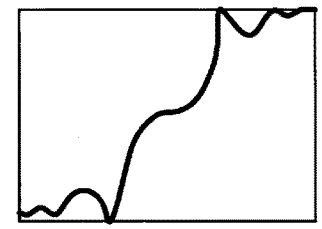

[Fig. 11]
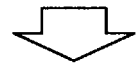
『Then he'll ask, "Can you make more?"』

[Fig. 12]
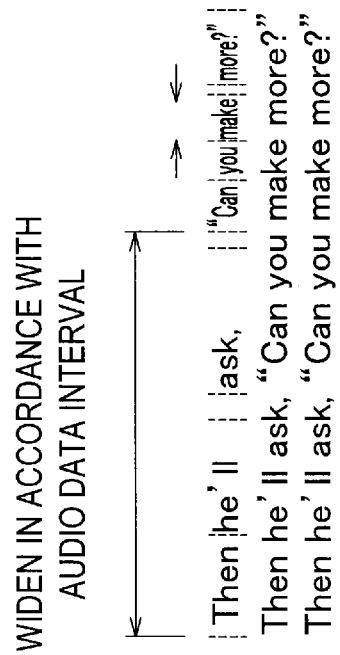

[Fig. 13]
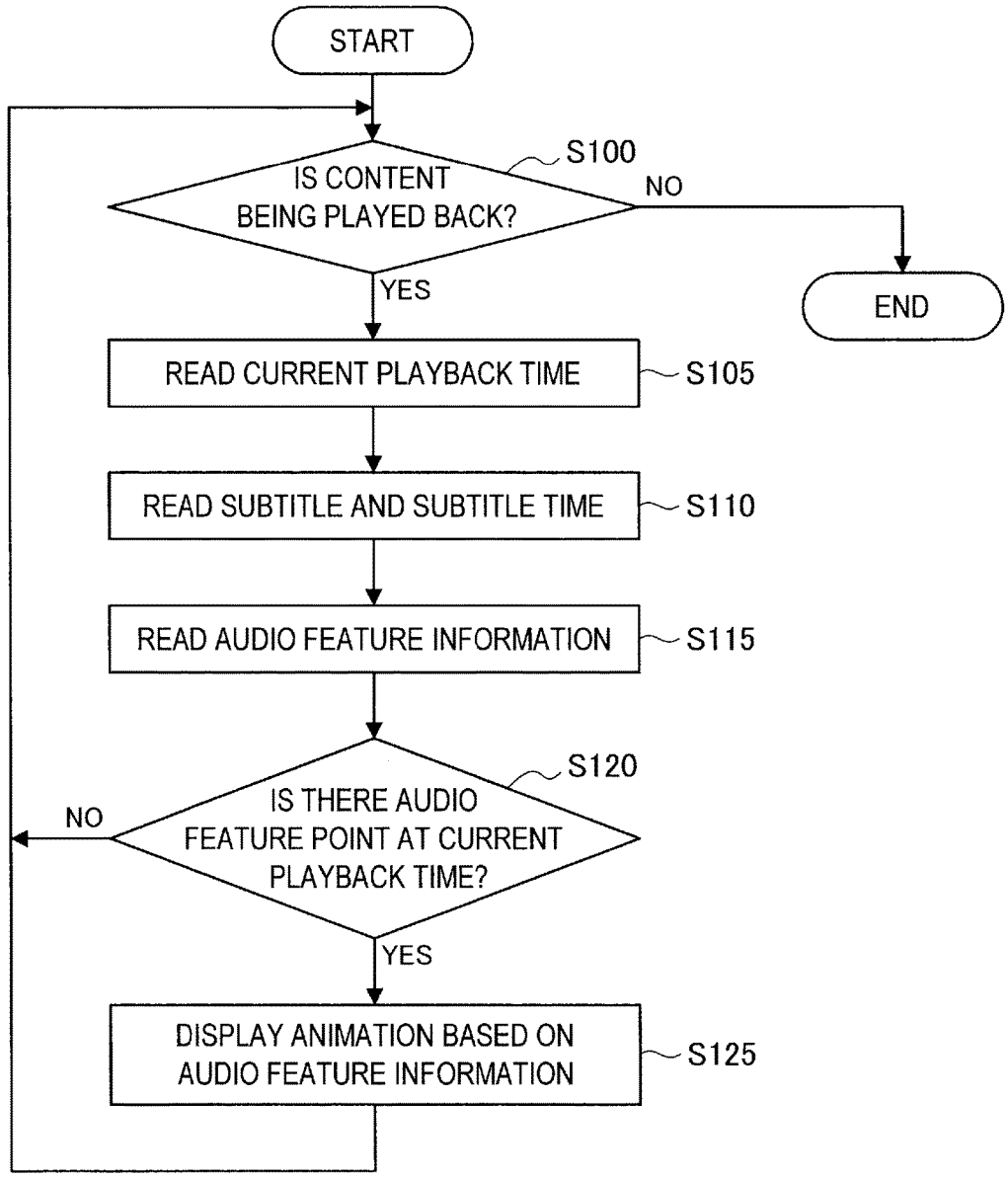

[Fig. 14]
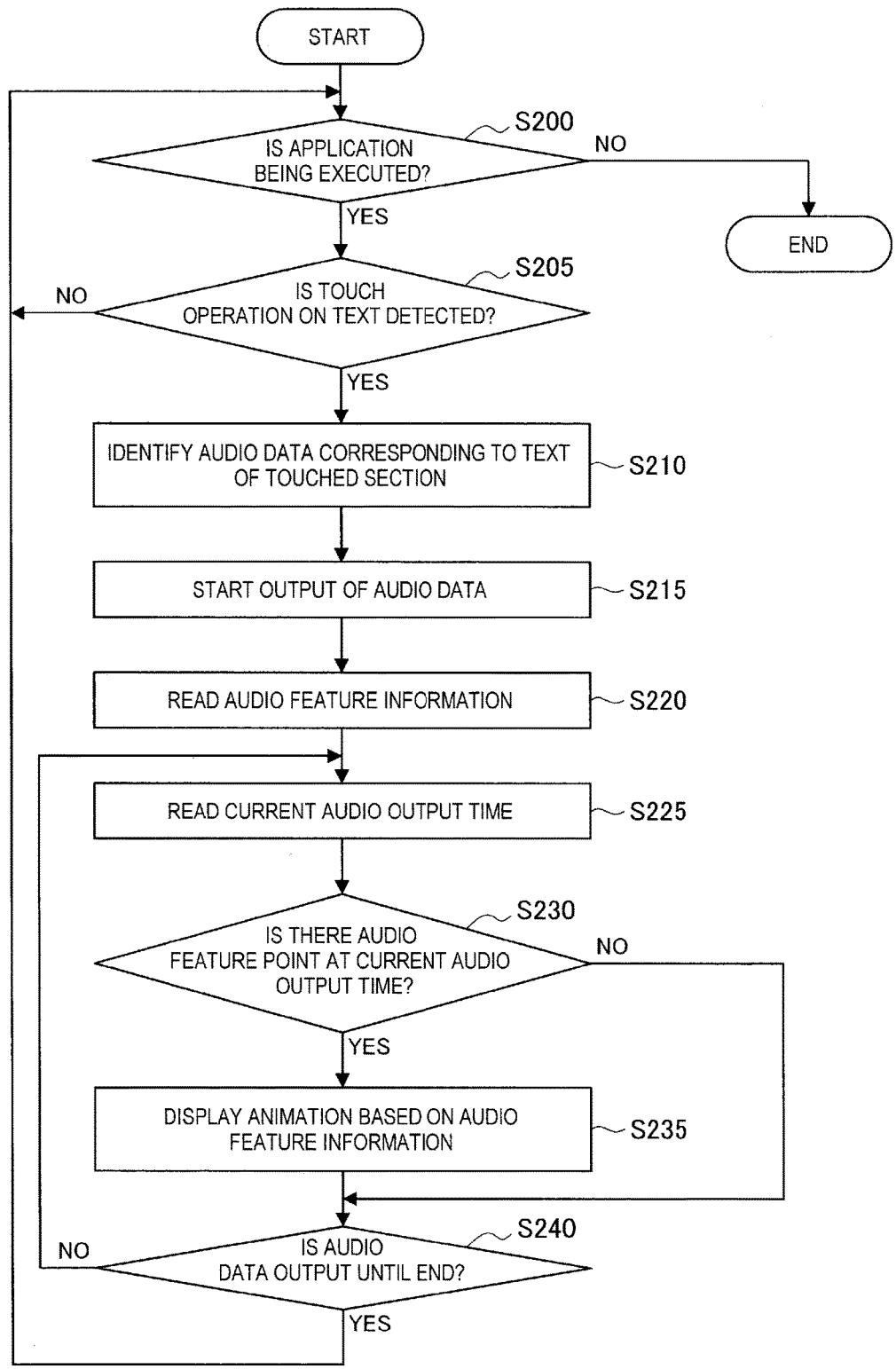

[Fig. 15]
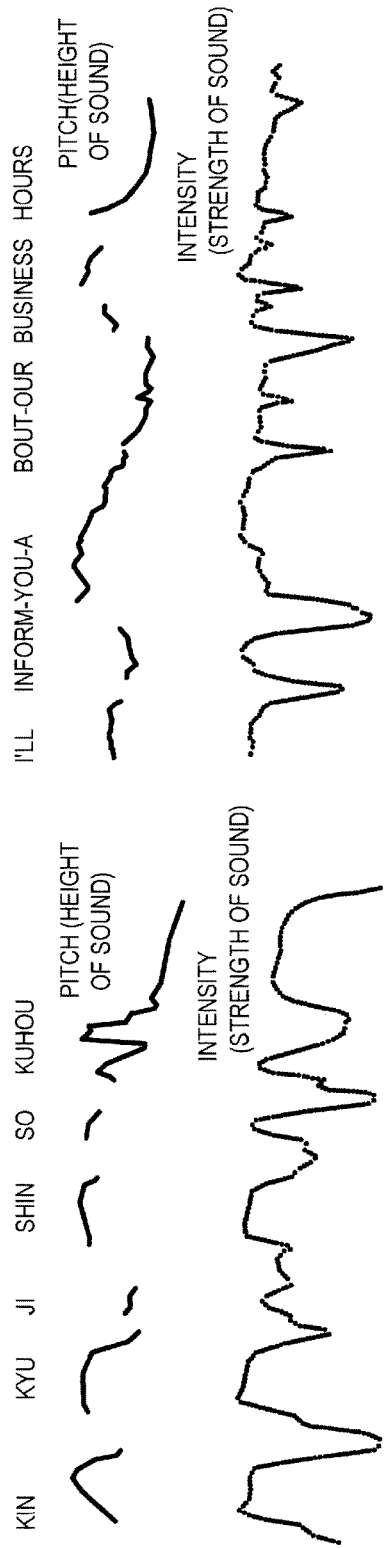

[Fig. 16]
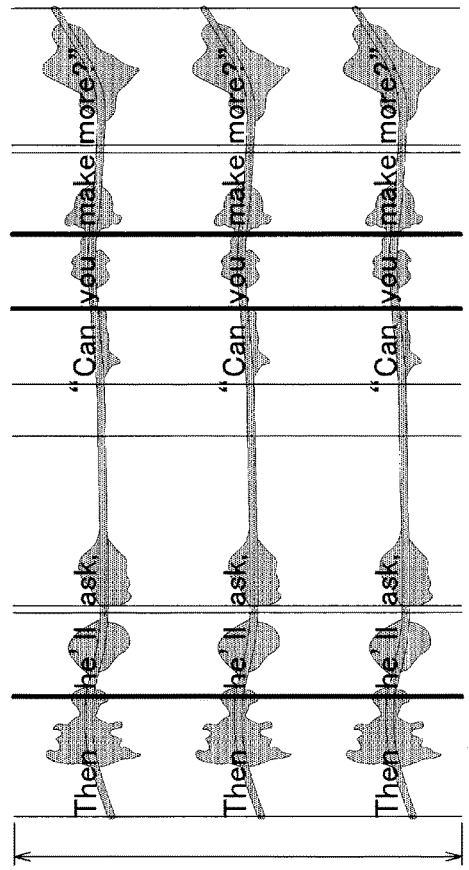
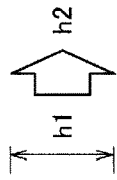

[Fig. 17]
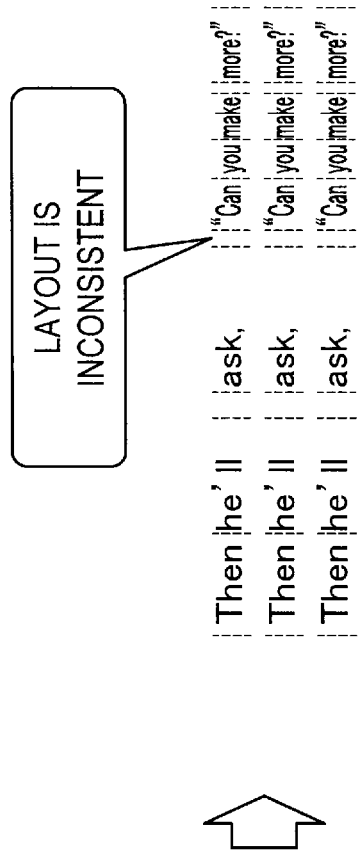

INFORMATION PROCESSING DEVICE AND METHOD FOR DISPLAYING SUBTITLE INFORMATION

TECHNICAL FIELD

The present disclosure relates to an information processing device, an information processing method and a program.

BACKGROUND ART

When learning a language other than one's mother tongue, there are cases in which pronunciation is learned by listening to audio. At this time, if text corresponding to the audio is displayed, it is easy for a user to grasp the content of the audio. For example, Patent Literature 1 discloses a playback device that can search a playback position in video based on subtitles added to the video. This playback device can repeatedly perform playback based on the subtitles. Therefore, sections that are difficult to hear can be repeatedly played back, thus enhancing learning effects.

CITATION LIST

Patent Literature

PTL 1: Japanese Patent Application Publication No. JP-A-09-115224

SUMMARY

Technical Problem

However, even though the user can grasp the content of the audio by looking at the displayed text, the user cannot grasp features of the audio. To address this, the present disclosure provides an information processing device, an information processing method and a program that are new and improved and that are capable of displaying features of audio.

Solution to Problem

According to a first exemplary embodiment, the disclosure is directed to an information processing system comprising: circuitry configured to read a current playback time of content reproduced by an output device; control a display to display subtitle information corresponding to the content reproduced by the output device; acquire feature information corresponding to an attribute of the content based on the read current playback time of the content; and control the display to apply a predetermined effect corresponding to the displayed subtitle information based on the acquired feature information.

According to another exemplary embodiment, the disclosure is directed to a method performed by an information processing system, the method comprising: reading a current playback time of content reproduced by an output device; controlling a display to display subtitle information corresponding to the content reproduced by the output device; acquiring feature information corresponding to an attribute of the content based on the read current playback time of the content; and controlling the display to apply a predetermined effect corresponding to the displayed subtitle information based on the acquired feature information.

According to another exemplary embodiment, the disclosure is directed to a non-transitory computer-readable medium including computer program instructions, which when executed by circuitry, cause the circuitry to perform a process comprising: reading a current playback time of content reproduced by an output device; controlling a display to display subtitle information corresponding to the content reproduced by the output device; acquiring feature information corresponding to an attribute of the content based on the read current playback time of the content; and controlling the display to apply a predetermined effect corresponding to the displayed subtitle information based on the acquired feature information.

Advantageous Effects of Invention

As described above, according to the present disclosure, it is possible to display features of audio.

BRIEF DESCRIPTION OF DRAWINGS

FIG. 1 is an explanatory diagram showing an overview of an animation that shows audio features displayed by a language learning device according to an embodiment of the present disclosure.

FIG. 2 is an explanatory diagram showing an overview of an animation that shows audio features displayed by the language learning device according to the embodiment.

FIG. 3 is a block diagram showing an example of a hardware configuration of the language learning device according to the embodiment.

FIG. 4 is a block diagram showing an example of a functional configuration of the language learning device according to the embodiment.

FIG. 5 is a diagram showing a first example of a display screen displayed by the language learning device according to the embodiment.

FIG. 6 is a diagram showing a second example of a display screen displayed by the language learning device according to the embodiment.

FIG. 7 is an explanatory diagram illustrating audio feature information that is used by the language learning device according to the embodiment.

FIG. 8 is an explanatory diagram showing an example of subtitle information including the audio feature information that is used by the language learning device according to the embodiment.

FIG. 9 is an explanatory diagram illustrating an example of playback control that is performed by the language learning device according to the embodiment using the audio feature information.

FIG. 10 is an explanatory diagram showing an example of an animation that the language learning device according to the embodiment displays based on audio features.

FIG. 11 is an explanatory diagram showing another example of an animation that the language learning device according to the embodiment displays based on audio features.

FIG. 12 is an explanatory diagram showing another example of an animation that the language learning device according to the embodiment displays based on audio features.

FIG. 13 is a flowchart showing a first operation example of the language learning device according to the embodiment.

FIG. 14 is a flowchart showing a second operation example of the language learning device according to the embodiment.

FIG. 15 is an explanatory diagram showing Japanese and English audio features.

FIG. 16 is an explanatory diagram showing an example in which audio waveform information is superimposed and displayed on text.

FIG. 17 is an explanatory diagram showing a display example in which the text is mapped in accordance with an audio length.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the explanation will be made in the following order.
1. Overview
2. Hardware configuration example
3. Functional configuration example
4. Display screen examples
5. Audio feature information example
6. Animation examples
7. Operation examples
8. Conclusion

1. OVERVIEW

First, an overview of a language learning service according to an embodiment of the present disclosure will be described with reference to FIG. 1, FIG. 2 and FIG. 15 to FIG. 17. FIG. 1 is an explanatory diagram showing an overview of an animation that shows audio features displayed by a language learning device according to an embodiment of the present disclosure. FIG. 2 is an explanatory diagram showing an overview of an animation that shows audio features displayed by the language learning device according to the embodiment. FIG. 15 is an explanatory diagram showing Japanese and English audio features. FIG. 16 is an explanatory diagram showing an example in which audio waveform information is superimposed and displayed on text. FIG. 17 is an explanatory diagram showing a display example in which the text is mapped in accordance with an audio length.

A language learning device 100 that provides the language learning service according to the embodiment of the present disclosure can show audio features using animation. Here, an explanation will be made assuming a case in which a Japanese person is learning English. However, the present technology is not limited to this example, and can be applied to a learning service to learn a language other than one's mother tongue.

When comparing the Japanese and English languages, there are features in which pitch (height of sound) of audio is different between the two languages. The Japanese language is a language in which there is a relatively high coincidence between characters seen by the eye and the pronunciation of the characters heard by the ear, while the English language is a language in which, in many cases, characters seen by the eye are different from the pronunciation of the characters heard by the ear. For example, FIG. 15 shows audio features of "kinkyu-jishin-sokuhou" (which means "early earthquake warning") in Japanese and audio features of "I'll inform you about our business hours" in English. In Japanese, separations in the text substantially match separations in the pitch, and the pitch forms a small peak for each word. In contrast to this, in English, the separations in the text do not match the separations in the pitch, and the pitch forms a large peak for the whole sentence. Since there are such dif-ferences, it is difficult for a person whose mother tongue is Japanese to follow English.

Given this, it is proposed that audio features corresponding to English text are displayed together with the English text. Here, the audio features may include at least one of pitch, sound length (tempo) and sound strength (intensity) of audio, for example.

As a method to display the audio features, it is conceivable that audio waveform information is superimposed and displayed on the text as shown in FIG. 16, for example. However, in a case where the audio waveform information is superimposed on the text, a space between text lines is widened in order to secure a height to display waveforms. For that reason, a height h2 that is set when the waveforms are superimposed and displayed on the text is larger than a height h1 that is set when the waveforms are not displayed.

Further, in a language, such as English, in which the sound length and the character length do not match, if the text is mapped in accordance with the sound length, the layout of the text is broken as shown in FIG. 17 and it is difficult to read the text. Further, although not shown in the drawings, if audio is output in accordance with the length of the text, the playback speed is of course not constant, and it is difficult to follow the output audio.

In this manner, if it is intended to show the audio features by static display, various inconveniences may occur. To address this, the present disclosure proposes that an animation is used to display the audio features. For example, FIG. 1 and FIG. 2 each show an example of an animation that shows the audio features.

For example, as shown in FIG. 1, cursor display can be used as an animation that is added to the sentence 'Then he'll ask, "Can you make more?"'. The cursor moves in accordance with an output position of audio, in a similar manner as when a cursor position moves in synchronization with a section of a lyric that is currently being sung in so-called karaoke. The upper part of FIG. 1 shows a cursor state when audio of the section "he" is output. The middle part of FIG. 1 shows a cursor state when audio of the section "ask" is output. The lower part of FIG. 1 shows a cursor state when audio of the section "you" is output. In this manner, the audio output position and the cursor position are synchronized. Thus, the tempo of the audio is indicated by the cursor position.

Further, the form of the cursor that is displayed here may change as shown in FIG. 2. For example, the size of a leading end portion of the cursor may change in accordance with the audio pitch or intensity. A pattern 1 in FIG. 2 shows an animation example of a case in which the audio pitch or intensity drops at the end of the sentence. At a point in time at which the audio pitch or intensity drops, the size of the leading end portion of the cursor is reduced. A pattern 2 in FIG. 2 shows an animation example of a case in which the audio pitch or intensity rises at the end of the sentence. At a point in time at which the pitch or intensity of the audio rises, the size of the leading end portion of the cursor is increased. A pattern 3 in FIG. 2 shows an animation example of a case in which the audio pitch or intensity rises at the middle of the sentence and then returns to an original level.

At a point in time at which the audio pitch or intensity rises, the size of the leading end portion of the cursor is increased, and then is returned to an original cursor size.

As described above, in comparison with a case in which the features of the output audio are statically shown for the whole text, according to the present technology in which the features of the "audio that is being output" are shown using animation (a change in the form of an animation object), the audio features can be effectively presented to the user in a limited space. The language learning device 100 to achieve this type of language learning service will be described below.

2. HARDWARE CONFIGURATION EXAMPLE

First, an example of a hardware configuration of the language learning device 100 according to the embodiment of the present disclosure will be described with reference to FIG. 3. FIG. 3 is a block diagram showing an example of the hardware configuration of the language learning device 100 according to the embodiment.

The language learning device 100 is an example of an information processing device that can provide the language learning service according to the embodiment of the present disclosure by executing an application, for example. The language learning device 100 may be, for example, an information processing device, such as a mobile phone, a personal computer (PC), a video processing device, a game machine, a household electric appliance, a music playback device or the like.

(Language Learning Device 100)

The language learning device 100 mainly includes, for example, a central processing unit (CPU) 105, a random access memory (RAM) 110, a nonvolatile memory 115, a display device 120, a touch sensor 125 and an audio output device 130.

The CPU 105 functions as a calculation device and a control device. The CPU 105 controls an overall operation of the language learning device 100 in accordance with various programs. Further, the CPU 105 may be a micro processor. The RAM 110 temporarily stores the programs that are executed by the CPU 105 and parameters etc. that vary appropriately when the programs are executed. The nonvolatile memory 115 stores the programs and operation parameters that are used by the CPU 105.

The display device 120 is an example of a display portion, and may be, for example, a liquid crystal display (LCD) device, an organic electroluminescence display (OELD) device, a cathode ray tube (CRT) display device or the like.

The touch sensor 125 is an example of an operation portion, and is provided such that it is superimposed on the display device 120. The touch sensor 125 is a position input device, and can receive an operation based on position information on a display screen.

The audio output device 130 is a speaker that outputs audio. The audio output device 130 can output audio that is included, for example, in content that is played back. Further, the audio output device 130 can also output synthetic voice that is generated from text data included in the content that is played back.

The hardware configuration of the language learning device 100 that has been shown here is merely an example, and the present technology is not limited to this example. In the hardware configuration to achieve the language learning service, a configuration to be used can be changed as appropriate in accordance with a technological level when the present embodiment is carried out.

3. FUNCTIONAL CONFIGURATION EXAMPLE

Next, an example of a functional configuration of the language learning device 100 will be described with reference to FIG. 4. FIG. 4 is a block diagram showing an example of the functional configuration of the language learning device 100 according to the embodiment.

The language learning device 100 mainly includes a playback control portion 150, an operation portion 155, an audio output control portion 160, an audio output portion 165, a display control portion 170, a display portion 175 and an audio feature information storage portion 180.

The playback control portion 150 has a function that controls playback of content. The playback control portion 150 can operate based on operation information that is supplied from the operation portion 155. The playback control portion 150 can select the content to be played back, based on the operation information. Further, the playback control portion 150 can control the playback of the content by controlling the audio output control portion 160 and the display control portion 170.

The operation portion 155 is an input device on which the user performs a desired operation, and may be the touch sensor 125, for example. The operation portion 155 can generate operation information based on an operation performed by the user, and can share the operation information with the playback control portion 150. When, for example, the user performs an operation to select content to be played back, an operation to select a playback position in the content, and an operation to set various parameters (for example, playback volume and playback speed) relating to the playback, the operation portion 155 can generate operation information in accordance with the operations.

The audio output control portion 160 can control the audio output by the audio output portion 165 in accordance with the control by the playback control portion 150. The audio output control portion 160 controls output of the audio corresponding to a specified playback section in the content specified by the playback control portion 150. When audio data is included in the specified content, the audio output control portion 160 can control output of the audio data. Further, the audio output control portion 160 may generate synthetic voice from the text of the specified content and may control output of the generated synthetic voice.

The audio output portion 165 has a function that outputs audio in accordance with the control by the audio output control portion 160. The audio output portion 165 may be the audio output device 130. Note that, here, although the language learning device 100 includes the audio output device 130, the present technology is not limited to this example. For example, the audio output portion 165 may be an interface that outputs audio to an external audio output device.

The display control portion 170 can control the content of a display screen that is output by the display portion 175 in accordance with the control by the playback control portion 150. The display control portion 170 can control the content of the display screen of the display portion 175 such that the specified playback section in the content specified by the playback control portion 150 is displayed. The display control portion 170 can control display of an animation object whose form changes based on features of the audio that is being output by the audio output portion 165. Here, the animation object may be, for example, an object that is superimposed and displayed on the text indicating the content of the audio. Further, the animation object may be, for example, a character included in the text indicating the content of the audio. The display control portion 170 can show the features of the audio using animation, by changing the form of the animation object. Here, the form of the animation object may be, for example, a shape, a size, a color, a display angle or the like.

The display portion 175 has a function that provides the user with a display screen in accordance with the control by the display control portion 170. The display portion 175 may be the display device 120. Although, here, the language learning device 100 includes the display device 120, the present technology is not limited to this example. For example, the display portion 175 may be an interface to cause an external display device to output the display screen.

The audio feature information storage portion 180 is an example of a storage portion having a function that stores audio feature information. The audio feature information storage portion 180 may be the nonvolatile memory 115, for example. Although details of the audio feature information will be described later, the audio feature information is information indicating audio features and may include, for example, information to identify a point at which audio has predetermined features in content. The audio feature point may be, for example, a point at which the pitch, the tempo or the intensity of the audio changes.

An example of the functions of the language learning device 100 according to the present embodiment is described above. Each of the structural elements described above may be realized by the hardware configuration shown in FIG. 3, or may be realized by using general-purpose members and circuits. Further, each of the structural elements described above may be formed by hardware dedicated to the function of each of the structural elements. Further, the function of each of the structural elements may be performed by an arithmetic device, such as a central processing unit (CPU), reading out a control program from a recording medium, such as a read only memory (ROM), a random access memory (RAM) or the like, and interpreting and executing the control program. The storage medium stores the control program in which a processing procedure to achieve these functions is described. Therefore, a configuration to be used can be changed as appropriate in accordance with a technological level when the present embodiment is carried out.

Note that a computer program to achieve each of the functions of the language learning device 100 according to the present embodiment described above can be created and installed in a personal computer or the like. Further, it is also possible to provide a computer-readable recording medium in which this type of computer program is stored. The recording medium is, for example, a magnetic disk, an optical disk, a magneto optical disk, a flash memory or the like. Further, the above-described computer program may be distributed, for example, via a network without using the recording medium.

4. DISPLAY SCREEN EXAMPLES

Next, display screen examples displayed by the language learning device 100 according to the present embodiment will be described with reference to FIG. 5 and FIG. 6. FIG. 5 shows a first example of a display screen displayed by the language learning device 100 according to the present embodiment. FIG. 6 shows a second example of a display screen displayed by the language learning device 100 according to the present embodiment.

Here, a first display screen that provides a language learning service using video content such as a movie, and a second display screen that outputs audio of a selected section of text content will be described as examples.

(First Display Screen)

The first display screen shown in FIG. 5 is an example of the display screen that provides the language learning service using video content. The first display screen shown in FIG. 5 can include a content display area 11, a subtitle display area 12, a learning record display area 13, a content list display area 14, a dictionary display area 15 and a relevant video display area 16. The subtitle display area 12 can include an active caption display area. The audio that is currently being output is displayed in the active caption display area. An animation object, which will be described in detail later, is displayed in the active caption display area.

(Second Display Screen)

The second display screen shown in FIG. 6 is an example of the display screen that provides the language learning service that outputs audio of a specified section of text data. Although, here, audio of a specified section of text in HTML content that is opened on the Internet is output, the present technology is not limited to this example. For example, the present technology may be applied to the whole content including the text data, without being limited to the HTML content.

5. AUDIO FEATURE INFORMATION EXAMPLE

Next, an example of audio feature information that is used by the language learning device 100 according to the embodiment of the present disclosure will be described with reference to FIG. 7 to FIG. 9. FIG. 7 is an explanatory diagram illustrating the audio feature information that is used by the language learning device 100 according to the embodiment. FIG. 8 is an explanatory diagram showing an example of subtitle information including the audio feature information that is used by the language learning device 100 according to the embodiment. FIG. 9 is an explanatory diagram illustrating an example of playback control that is performed by the language learning device 100 according to the embodiment using the audio feature information.

When taking an example of the first display screen that plays back the subtitle and the audio data of video content such a movie, the audio feature information has a format shown in FIG. 7, for example. The audio feature information may include, for example, a commandID, a time to identify audio feature points, and a separator to distinguish between each of the audio feature points. Examples of the commandID include PU, which indicates a point at which the pitch increases, PD, which indicates a point at which the pitch decreases, and SP, which indicates a point at which the tempo changes. Description examples include PU24868; SP25058; and the like. PU24868; indicates that the pitch increases at 24868 milliseconds. SP25058; indicates that the tempo changes at 25058 milliseconds.

This type of audio feature information may be included as part of the subtitle information, as shown in FIG. 8, for example. The subtitle information can include, for example, a subtitle ID, a subtitle display time, audio feature information and subtitle text. FIG. 9 shows an example of a control method used when the content playback is controlled by referring to this type of subtitle information.

Here, a case will be described, as an example, in which the subtitle display time of a subtitle ID 9 is "00:00:34,448" to "00:00:36,575" and four pieces of audio feature information "SP34348; SP35568; SP35578; SP36188" are added to the audio corresponding to this subtitle. The subtitle text of this subtitle is "I wasn't talking about China anymore, I was talking about me." At this time, the language learning device 100 can control cursor display based on this audio feature information.

This audio feature information indicates that the tempo changes at four points in time, i.e., 34348, 35568, 35578 and 36188. Therefore, it can be considered that the four points in time respectively correspond to a start position and an end position of "I wasn't talking about China anymore," in the subtitle text and a start position and an end position of "I was talking about me." Given this, the language learning device 100 can allocate a cursor speed using these pieces of information. More specifically for this example, a start time and an end time of "I wasn't talking about China anymore," can be set to 34348 milliseconds and 35568 milliseconds, respectively, and a start time and an end time of "I was talking about me." can be set to 35578 milliseconds and 36188 milliseconds, respectively.

6. ANIMATION EXAMPLES

Next, a display example of an animation object displayed by the language learning device 100 according to the embodiment of the present disclosure will be described with reference to FIG. 10 to FIG. 12. FIG. 10 is an explanatory diagram showing an example of an animation that the language learning device 100 according to the embodiment displays based on audio features. FIG. 11 is an explanatory diagram showing another example of an animation that the language learning device 100 according to the embodiment displays based on audio features. FIG. 12 is an explanatory diagram showing another example of an animation that the language learning device 100 according to the embodiment displays based on audio features.

The display control portion 170 can display audio features using the animations shown in FIG. 1, FIG. 2, and FIG. 10 to FIG. 12, for example. Referring to FIG. 10, an example is shown of an animation object that indicates the audio features by changing the form of a character. Here, it is possible to achieve animation expression by changing the displayed character based on the audio features. For example, the size of the character may be enlarged or reduced. The display angle of the character may be rotated. A part (for example, a vertex) of the character may be deformed. Here, a plurality of graphs indicating animation patterns are displayed. The form of the animation object may be changed in accordance with the graphs. Further, although not shown in the drawings, the color of the character may be changed in accordance with the audio features. The display control portion 170 can change the form of the animation object at a feature point indicated by the audio feature information.

FIG. 11 shows an example in which an animation object that is expressed by changing the character size is combined with the animation object shown in FIG. 2 that is expressed by cursor movement and a size change of the leading end portion of the cursor. The size of the leading end portion of the cursor and the size of the character may be enlarged or reduced at the audio feature point included in the text data, for example.

Further, as shown in FIG. 12, the audio features may be indicated by character spacing. If the whole text is displayed in accordance with the audio tempo, the whole layout is broken as shown in FIG. 17 and it is difficult to read the text. Further, a space is necessary between the characters in accordance with the audio tempo. As a result, the display area is increased in comparison with a case in which the texts are displayed such that the characters are equally spaced and arranged close together. However, here, a section of the text for which audio is being output is displayed in accordance with the audio tempo, and the text other than the section for which the audio is being output is displayed such that the characters are close together. Further, at this time, since the display area becomes insufficient due to the enlargement of the text corresponding to the audio that is being output, the text other than the section for which the audio is being output may be crushed and displayed. Thus, using the display area that is the same size as when the texts are displayed such that the characters are equally spaced and arranged close together, the section of the text for which the audio is being output is displayed such that the space between the characters is enlarged in accordance with the audio tempo.

7. OPERATION EXAMPLES

Next, operation examples of the language learning device 100 according to the embodiment of the present disclosure will be described with reference to FIG. 13 and FIG. 14. Note that, here, a first operation example when providing the first display screen that provides the language learning service using video content, such as a movie, illustrated in FIG. 5, and a second operation example when providing the second display screen that outputs audio of a selected section of text content illustrated in FIG. 6, will be respectively described. FIG. 13 is a flowchart showing the first operation example of the language learning device 100 according to the embodiment. FIG. 14 is a flowchart showing the second operation example of the language learning device 100 according to the embodiment.

First Operation Example

Firstly, the first operation example will be described with reference to FIG. 13. The playback control portion 150 determines whether or not content is being played back (step S100). In other words, the operation described below is repeated until the content playback is stopped.

When it is determined that the content is being played back, the playback control portion 150 reads a current playback time (step S105). The playback control portion 150 performs control such that the audio output control portion 160 and the display control portion 170 respectively output audio and a display screen corresponding to the playback time. Here, the display control portion 170 reads, from the current playback time, the subtitle to be displayed next and subtitle time (step S110). Further, the display control portion 170 reads the audio feature information (step S115).

Then, based on the audio feature information, the display control portion 170 determines whether or not there is an audio feature point at the current playback time (step S120). When there is the audio feature point at the current playback time, the display control portion 170 causes an animation that is based on the audio feature information to be displayed (step S125).

With the above-described operation, an animation is displayed on the subtitle in video content such as a movie, in a section where there is an audio feature, such as, for example, a section where the pitch or intensity changes by at least a predetermined threshold value, or a section where the tempo changes. The animation that is displayed here is achieved by a change in the form of an animation object. The animation object may be a cursor that is superimposed on the text. Alternatively, the animation object may be the text itself. Further, the change in the form may be a change in size, shape, color or arrangement. Thus, the user can visually grasp the audio feature. Further, if the feature of the audio "that is currently being output" only is displayed by animation, it is possible to effectively use the display area.

Second Operation Example

Next, the second operation example will be described with reference to FIG. 14. The playback control portion 150 determines whether or not an application is being executed (step S200). In other words, the operation described below is repeated until execution of the application is stopped.

When it is determined that the application is being executed, the playback control portion 150 determines whether or not the operation portion 155 has detected a touch operation on the text (step S205). When the touch operation is detected on the text, the playback control portion 150 identifies audio data corresponding to the text of the touched section (step S210). The playback control portion 150 controls the audio output control portion 160 to output the audio data of the identified section, and controls the display control portion 170 to display a display screen corresponding to the audio data. Here, the audio output control portion 160 starts output of the identified audio data (step S215). Although it is assumed here that the audio data exists in advance, the present technology is not limited to this example. For example, when the text of the touched section is identified as described above, the audio output control portion 160 may generate synthetic voice from the identified text.

The display control portion 170 reads the audio feature information (step S220). Further, the display control portion 170 reads a current audio output time (step S225). Then, the display control portion 170 determines whether or not there is an audio feature point at the current audio output time (step S230). When there is the audio feature point at the current audio output time, the display control portion 170 causes an animation that is based on the audio feature information to be displayed (step S235). On the other hand, when there is no audio feature point at the current audio output time, the processing at step S235 is omitted. Next, the playback control portion 150 determines whether or not the identified audio data has been output until the end (step S240). When the audio data has not been output until the end, the processing returns to step S225 and the processing is repeated. On the other hand, when the audio data has been output until the end, the processing returns to step S200 and the processing is repeated.

8. CONCLUSION

As described above, with the language learning device 100 according to the embodiment of the present disclosure, it is possible to effectively show audio features on the display screen. By using animation, the features of the audio that is being output are effectively shown, in comparison with a case in which all audio features included in content are simultaneously shown. Further, since only the features of the audio that is being output are displayed, sections other than the section corresponding to the audio that is being output can be displayed in a normal state, in a limited display area. Thus, readability is also improved.

The preferred embodiment of the present disclosure is described in detail above with reference to the appended drawings. However, the technical scope of the present disclosure is not limited to the above-described examples. It should be understood by those skilled in the art that various modifications, combinations, sub-combinations and alterations may occur depending on design requirements and other factors insofar as they are within the scope of the appended claims or the equivalents thereof.

For example, an information processing device to which the present technology is applied can be applied to any device having a display control function that displays audio features. The above description shows an example in which the cursor is displayed on the subtitle of the movie content, and an example in which an animation is displayed on the text of the HTML content. However, the present technology is not limited to these examples. According to a working example in which audio features are displayed by animation on the subtitle of movie content, the movie content can be used as an educational tool for language learning. Further, according to a working example in which audio features are displayed by animation on the text of content, any general text can be used as an educational tool for language learning. Note that, although a tablet terminal or a smart phone having a touch sensor is described above as an example of the hardware, the present technology is not limited to such an example. The present technology can be applied to all information processing devices.

In this specification, the steps described in the flowcharts include not only the processing that is performed in time series in the described order, but also the processing that is performed in parallel or individually rather than necessarily being performed in time series. Further, even in the steps that are processed in time series, it is needless to mention that the order can be changed as appropriate.

Additionally, the present technology may also be configured as below.

(1) An information processing system comprising: circuitry configured to read a current playback time of content reproduced by an output device; control a display to display subtitle information corresponding to the content reproduced by the output device; acquire feature information corresponding to an attribute of the content based on the read current playback time of the content; and control the display to apply a predetermined effect corresponding to the displayed subtitle information based on the acquired feature information.

(2) The information processing system (1), wherein the content reproduced by the output device is audio content, and the subtitle information corresponds to the audio content.

(3) The information processing system of (2), wherein the feature information corresponds to a pitch of the audio content.

(4) The information processing system of (2), wherein the feature information corresponds to a tempo of the audio content.

(5) The information processing system of (2), wherein the feature information corresponds to an intensity of the audio content.

(6) The information processing system of any of (1) to (5), wherein the circuitry controls the display to superimpose a visual effect, as the predetermined effect, on the displayed subtitle information.

(7) The information processing system of any of (1) to (6), wherein the predetermined effect is a waveform corresponding to the attribute of the content.

(8) The information processing system of (7), wherein the circuitry is configured to control the display to superimpose the waveform over the displayed subtitle information.
(9) The information processing system of any of (1) to (8), wherein the circuitry is configured to control the display to display a cursor corresponding to the subtitle information, and control the display to move the cursor based on the read current playback time of the audio content.
(10) The information processing system of (9), wherein the circuitry is configured to control the display to apply the predetermined effect to the cursor based on the acquired feature information.
(11) The information processing system of any of (9) and (10), wherein the circuitry is configured to control the display to apply the predetermined effect to a leading edge of the cursor based on the acquired feature information.
(12) The information processing system of any of (10) and (11), wherein the acquired feature information corresponds to a pitch or intensity of the content, and the circuitry controls the display to change a size of the cursor based on the acquired feature information corresponding to the pitch or intensity of the content.
(13) The information processing system of (12), wherein the circuitry controls the display to increase the size of the cursor when the acquired feature information indicates that the pitch or intensity of the content increases.
(14) The information processing system of any of (12) and (13), wherein the circuitry controls the display to decrease the size of the cursor when the acquired feature information indicates that the pitch or intensity of the content decreases.
(15) The information processing system of any of (1) to (14), wherein the content reproduced by the output device includes video data, and the subtitle information corresponds to the video data.
(16) The information processing system of any of (1) to (15), wherein the circuitry is configured to apply the predetermined effect to text characters included in the displayed subtitle information.
(17) The information processing system of (16), wherein the predetermined effect applied to the text characters includes changing at least one of a size, shape, color and display angle of the text characters.
(18) The information processing system of (17), wherein the circuitry is configured to apply the predetermined effect to a leading character of the text characters based on the read current playback time of the content.
(19) A method performed by an information processing system, the method comprising: reading a current playback time of content reproduced by an output device; controlling a display to display subtitle information corresponding to the content reproduced by the output device; acquiring feature information corresponding to an attribute of the content based on the read current playback time of the content; and controlling the display to apply a predetermined effect corresponding to the displayed subtitle information based on the acquired feature information.
(20) An information processing device including:
an audio output control portion that controls output of audio; and
a display control portion that controls display of an animation object whose form changes based on a feature of the audio that is being output.
(21) The information processing device according to (20), wherein the display control portion causes at least one of a size, a shape, a color, or a display angle of the animation object to change, at a point at which the feature of the audio that is being output changes.
(22) The information processing device according to (20) or (21), wherein the feature of the audio is at least one of pitch, tempo, or intensity of the audio.
(23) The information processing device according to any one of (20) to (22), wherein the animation object is superimposed and displayed on text.
(24) The information processing device according to (23), wherein the animation object that is superimposed and displayed on the text is a cursor whose size changes in synchronization with a position of the audio that is being output, and a leading end size of the cursor changes when the form changes at a point at which the feature of the audio changes.
(25) The information processing device according to any one of (20) to (24), wherein the animation object is text corresponding to the audio.
(26) The information processing device according to (25), wherein the display control portion causes character spacing of the text to change based on the feature of the audio that is being output.
(27) The information processing device according to any one of (20) to (26), wherein text corresponding to the audio is subtitle text of video content.
(28) An information processing method including:
controlling output of audio; and
    controlling display of an animation object whose form changes based on a feature of the audio that is being output.
(29) A program that causes a computer to function as an information processing device including:
an audio output control portion that controls output of audio; and
a display control portion that controls display of an animation object whose form changes based on a feature of the audio that is being output.
(30) The program according to (29), wherein
the display control portion causes at least one of a size, a shape, a color, or a display angle of the animation object to change, at a point at which the feature of the audio that is being output changes.
(31) The program according to (29) or (30), wherein the feature of the audio is at least one of pitch, tempo, or intensity of the audio.
(32) The program according to any one of (29) to (31), wherein the animation object is superimposed and displayed on text.
(33) The program according to (32), wherein
the animation object that is superimposed and displayed on the text is a cursor whose size changes in synchronization with a position of the audio that is being output, and a leading end size of the cursor changes when the form changes at a point at which the feature of the audio changes.
(34) The program according to any one of (29) to (33), wherein the animation object is text corresponding to the audio.
(35) The program according to (34), wherein
the display control portion causes character spacing of the text to change based on the feature of the audio that is being output.
(36) The program according to any one of (29) to (35), wherein text corresponding to the audio is subtitle text of video content.
(37) A non-transitory computer-readable medium including computer program instructions, which when executed by circuitry, cause the circuitry to perform a process comprising: reading a current playback time of content reproduced by an output device; controlling a display to display subtitle information corresponding to the content reproduced by the output device; acquiring feature information corresponding to an attribute of the content based on the read current playback time of the content; and controlling the display to apply a predetermined effect corresponding to the displayed subtitle information based on the acquired feature information.

REFERENCE SIGNS LIST

100 Language learning device
105 CPU
110 RAM
115 Nonvolatile memory
120 Display device
125 Touch sensor
130 Audio output device
150 Playback control portion
155 Operation portion
160 Audio output control portion
165 Audio output portion
170 Display control portion
175 Display portion
180 Audio feature information storage portion

The invention claimed is:

1. An information processing system, comprising:
circuitry configured to:
  read a current playback time of content, wherein the content is reproduced by an output device;
  control a display screen to display subtitle information corresponding to the content,
    wherein the subtitle information includes a plurality of text characters corresponding to the content;
  determine audio feature information based on the current playback time of the content, wherein the audio feature information indicates at least a tempo of the content; and
  control the display screen to:
    increase a space between a first text character of the plurality of text characters and a second text character of the plurality of text characters based on the tempo of the content;
    display a cursor on the subtitle information based on the audio feature information; and
    display at least one of a first visual effect or a second visual effect at the cursor based on the audio feature information.

2. The information processing system of claim 1, wherein the content reproduced by the output device is audio content and the subtitle information corresponds to the audio content.

3. The information processing system of claim 2, wherein the audio feature information corresponds to an audio pitch of the audio content.

4. The information processing system of claim 2, wherein the audio feature information corresponds to a tempo of the audio content.

5. The information processing system of claim 2, wherein the audio feature information corresponds to an intensity of the audio content.

6. The information processing system of claim 1, wherein the circuitry is further configured to control the display screen to superimpose one of the first visual effect or the second visual effect on the displayed subtitle information.

7. The information processing system of claim 1, wherein at least one of the first visual effect or the second visual effect comprises a waveform corresponding to an attribute of the content, and the circuitry is further configured to control the display screen to superimpose the waveform over the displayed subtitle information.

8. The information processing system of claim 1, wherein the circuitry is further configured to move the cursor based on the current playback time of the content.

9. The information processing system of claim 8, wherein the circuitry is further configured to control, based on the audio feature information, the display screen to display one of the first visual effect or the second visual effect at a leading edge of the cursor.

10. The information processing system of claim 8, wherein the audio feature information corresponds to at least one of an audio pitch of the content or an audio intensity of the content.

11. The information processing system of claim 10, wherein
the circuitry is further configured to control the display screen to increase a size of the cursor, and
the size of the cursor is increased based on the audio feature information that indicates an increase in one of the audio pitch of the content or the audio intensity of the content.

12. The information processing system of claim 10, wherein
the circuitry is further configured to control the display screen to decrease a size of the cursor, and
the size of the cursor is decreased based on the audio feature information that indicates a decrease in one of the audio pitch of the content or the audio intensity of the content.

13. The information processing system of claim 1, wherein
the content reproduced by the output device includes video data, and
the subtitle information corresponds to the video data.

14. The information processing system of claim 1, wherein the circuitry is further configured to control the display screen to display at least one of the first visual effect or the second visual effect on a third text character of the plurality of text characters.

15. The information processing system of claim 14, wherein the circuitry is further configured to vary the third text character based on a variation of at least one of a size of the third text character, a shape of the third text character, a color of the third text character, or a display angle of the third text character.

16. The information processing system of claim 15, wherein
the circuitry is further configured to control the display screen to display at least one of the first visual effect or the second visual effect on a leading character of the plurality of text characters, and
at least one of the first visual effect or the second visual effect is displayed on the leading character based on the current playback time of the content.

17. A method, comprising:
in an information processing system:
  reading a current playback time of content reproduced by an output device;
  controlling a display screen to display subtitle information corresponding to the content,
    wherein the subtitle information includes a plurality of text characters corresponding to the content;

determining audio feature information based on the current playback time of the content, wherein the audio feature information indicates at least a tempo of the content; and controlling the display screen to:
increase a space between a first text character of the plurality of text characters and a second text character of the plurality of text characters based on the tempo of the content;

display a cursor on the subtitle information based on the audio feature information; and display at least one of a first visual effect or a second visual effect at the cursor based on the audio feature information.

18. A non-transitory computer-readable medium having stored thereon computer-executable instructions, which when executed by a processor of an information processing system, cause the processor to execute operations, the operations comprising:

reading a current playback time of content reproduced by an output device;

controlling a display screen to display subtitle information corresponding to the content,
wherein the subtitle information includes a plurality of text characters corresponding to the content;

determining audio feature information based on the current playback time of the content, wherein the audio feature information indicates at least a tempo of the content; and controlling the display screen to:
increase a space between a first text character of the plurality of text characters and a second text character of the plurality of text characters based on the tempo of the content;

display a cursor on the subtitle information based on the audio feature information; and display at least one of a first visual effect or a second visual effect at the cursor based on the audio feature information.

19. The information processing system of claim 1, wherein
the content reproduced by the output device is audio content, and
the audio feature information indicates one of a change in an audio pitch of the audio content or a change in a tempo of the audio content.

20. The information processing system of claim 7, wherein
the circuitry is further configured to control the display screen to increase a vertical distance between a first text line of the subtitle information and a second text line of the subtitle information, and
the increase in the vertical distance is based on the waveform.

* * * * *